US010782923B1

(12) United States Patent
Annamalai Thangaraj et al.

(10) Patent No.: US 10,782,923 B1
(45) Date of Patent: Sep. 22, 2020

(54) SYSTEMS AND METHODS FOR ASSISTING USERS THROUGH INTERACTIVE VOICE-BASED JOB-RELATED INSTRUCTIONS VIA MULTI-FUNCTION DEVICE

(71) Applicant: XEROX CORPORATION, Norwalk, CT (US)

(72) Inventors: Sathish Kumar Annamalai Thangaraj, Chennai (IN); Brindha Brammanayagam, Chennai (IN); Purushothaman Jayakumar, Chennai (IN)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/290,998

(22) Filed: Mar. 4, 2019

(51) Int. Cl.
  *G06F 3/12* (2006.01)
  *H04N 1/00* (2006.01)
  *H04N 1/44* (2006.01)
  *G06F 3/16* (2006.01)

(52) U.S. Cl.
  CPC .......... *G06F 3/1204* (2013.01); *G06F 3/1206* (2013.01); *G06F 3/1253* (2013.01); *G06F 3/1292* (2013.01); *G06F 3/167* (2013.01); *H04N 1/00395* (2013.01); *H04N 1/00403* (2013.01); *H04N 1/00477* (2013.01); *H04N 1/4413* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2011/0069661 | A1* | 3/2011 | Waytena, Jr. | H04W 76/10 370/328 |
| 2011/0075198 | A1* | 3/2011 | Agehama | G06F 3/1203 358/1.15 |
| 2012/0047070 | A1* | 2/2012 | Pharris | G06Q 20/108 705/43 |
| 2013/0135640 | A1* | 5/2013 | Nagasaki | G06F 3/122 358/1.11 |
| 2015/0355873 | A1* | 12/2015 | Choi | G06F 3/1204 358/1.15 |
| 2019/0109952 | A1* | 4/2019 | Nishiyama | H04N 1/00209 |

* cited by examiner

*Primary Examiner* — Helen Zong

(57) ABSTRACT

The disclosure discloses methods and systems for assisting users via interactive voice-based job-related instructions. The method includes receiving a job from a user. A call is received from a mobile device of the user. A call connection is established between the mobile device and a multi-function device. It is then checked whether the mobile device is a registered mobile device. After checking, the job corresponding to the user is identified. An interactive voice response (IVR) unit is automatically activated over the established call. Then, one or more initial voice-based instructions are transmitted to the mobile device of the user. An input key is submitted through the mobile device based on at least one initial voice-based instruction. Based on the input key, further one or more voice-based instructions are transmitted to the mobile device of the user, the further one or more voice-based instructions provide information about the print job.

27 Claims, 9 Drawing Sheets

SYSTEMS AND METHODS FOR ASSISTING USERS THROUGH INTERACTIVE VOICE-BASED JOB-RELATED INSTRUCTIONS VIA MULTI-FUNCTION DEVICE

CROSS-REFERENCE TO RELATED APPLICATIONS

Cross-referenced is commonly assigned, entitled "Systems and Methods for Providing Assistance Through One or More Voice-Based Instructions via Multi-Function Device," Ser. No. 16/290,999.

TECHNICAL FIELD

The present disclosure relates to the field of multi-function devices, more specifically, relates to methods and systems for assisting users via interactive voice-based instructions related to jobs.

BACKGROUND

Multi-function devices have gained popularity due to their wide variety of features and functions and thus, have become the need of every business, be it small or big. A multi-function device incorporates the functionality of multiple devices into a single device including a printer, a scanner, a copier, and a fax machine. Generally, the multi-function device is used by sighted users but can also be used by visually impaired users. To assist the visually impaired users, braille supported devices, or 508 enabled devices are provided to provide their inputs to the multi-function device or to read their printed version/output in a better fashion. To use such services, the visually impaired users need to handle several navigations.

It is always difficult for the visually impaired users to handle submitted/processing jobs in the multi-function device. Though the visually impaired users have some easier options to submit secure print jobs (via print drivers) but they still face difficulty while handling the submitted secure print jobs. For example, after sending the secure print jobs, a visually impaired user may need to release his job using a smart card or using a braille keyboard. In both the releasing methods, the visually impaired user needs to navigate to corresponding screen to release his specific secure print job. In case the visually impaired user uses the braille keyboard to enter the secure print job's passcode, then the entered passcode may be easily exposed to other users.

Like the submitted jobs, the visually impaired user faces difficulty while handling his processing/progressing jobs in the multi-function device. If multiple jobs of different users are present in a job queue, then the visually impaired user does not know the details such as when his job will be completed, how much time it will take to complete, etc. Further, the visually impaired user is not sure about the resource availability for his job or is not sure about the current status of his job. Moreover, after completion of his job, it is difficult for the visually impaired user to find in which output tray the job is delivered and is equally difficult to trace the correct printouts among the delivered printouts of different users. The problems associated with the submitted and/or processing jobs are also faced by sighted users. For example, they are also not sure about the time for their respective jobs, which output tray will be used for delivering their printouts and so on. Therefore, there is a need for efficient methods and systems to assist users for handling jobs such as print jobs.

SUMMARY

According to aspects illustrated herein, a method for assisting users for a print job via interactive voice-based instructions is disclosed. The method is implemented at a multi-function device. The method includes receiving the print job from a user. A call is received from a mobile device of the user. A call connection is established between the mobile device and the multi-function device. It is further checked whether the mobile device is a registered mobile device. After checking, the print job corresponding to the user is identified. Then, an interactive voice response (IVR) unit is automatically activated over the established call. Then, one or more initial voice-based instructions are transmitted to the mobile device of the user over the established call. The one or more initial voice-based instructions relate to the print job of the user. An input key submitted through the mobile device of the user is received, based on at least one initial voice-based instruction. Based on the input key, further one or more voice-based instructions are transmitted to the mobile device of the user over the established call, the further one or more voice-based instructions provide information about the print job, without requiring the user to be present at the multi-function device.

A multi-function device including a communication unit, a controller and an interactive voice response (IVR) unit, is disclosed. The communication unit receives a call from a mobile device of the user. The controller establishes a call connection between the mobile device and the multi-function device; checks whether the mobile device is a registered mobile device; after checking, identifies a print job corresponding to the user and automatically activates an interactive voice response (IVR) unit over the established call. The IVR unit transmits one or more initial voice-based instructions to the mobile device of the user over the established call, wherein the one or more initial voice-based instructions relate to the print job of the user; receives an input key submitted through the mobile device of the user, based on at least one initial voice-based instruction; and based on the input key, transmits further one or more voice-based instructions to the mobile device of the user over the established call, wherein the further one or more voice-based instructions provide information about the print job, without requiring the user to be present at the multi-function device.

A system including a mobile device, a multi-function device, and a Light Weight Directory Access Protocol (LDAP) server, is disclosed. The mobile device transmits a call request to the multi-function device, wherein the mobile device is associated with a mobile number. The multi-function device is communicatively coupled to the mobile device. The multi-function device includes a communication unit for receiving the call request from the mobile device of the user. The multi-function device includes a controller for establishing a call connection between the mobile device and the multi-function device; identifying a print job corresponding to the user; and automatically activating an interactive voice response (IVR) unit over the established call. The multi-function device includes the IVR unit for transmitting one or more initial voice-based instructions to the mobile device of the user over the established call, wherein the one or more initial voice-based instructions relate to the print job of the user; receiving an input key submitted through the mobile device based on at least one initial voice-based instruction; and based on the input key, transmitting further one or more voice-based instructions to the mobile device of the user over the established call, wherein the further one or more voice-based instructions provide information about the print job, without requiring the user to be present at the multi-function device. The LDAP server is communicatively coupled to the multi-function device. The LDAP server stores user details, a passcode, and the mobile number associated with the mobile device of the user and authenticates the user based on the mobile number and the user details.

A system including a multi-function device and a server, is disclosed. The multi-function device is communicatively coupled to the server. The multi-function device includes a communication unit for receiving a call from a mobile device of a user. The server stores user details and a mobile number associated with a mobile device of the user; authenticates the user based on the mobile number and the user details; checks whether the mobile device is a registered mobile device; automatically activates an interactive voice response (IVR) unit over an established call; transmits one or more initial voice-based instructions to the mobile device of the user over the established call, wherein the one or more initial voice-based instructions relate to the print job of the user; receives an input key submitted through the mobile device based on at least one initial voice-based instruction; and based on the input key, transmits further one or more voice-based instructions to the mobile device of the user over the established call, wherein the further one or more voice-based instructions provide information about the print job, without requiring the user to be present at the multi-function device.

An interactive voice response (IVR) unit for assisting users through one or more voice-based instructions, is disclosed. The IVR unit transmits one or more initial voice-based instructions to a mobile device of a user over an established call, wherein the one or more initial voice-based instructions comprise one or more options for the user; receives an input key submitted through the mobile device based on at least one initial voice-based instruction; and based on the input key, transmits further one or more voice-based instructions to the mobile device of the user over the established call, wherein the further one or more voice-based instructions provide information about the print job.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1A illustrates an exemplary physical multi-function device coupled to a mobile device, while

FIG. 2A is an overall block diagram of a system assisting users via voice-based instructions related to jobs, while

DESCRIPTION

Figure 1A:
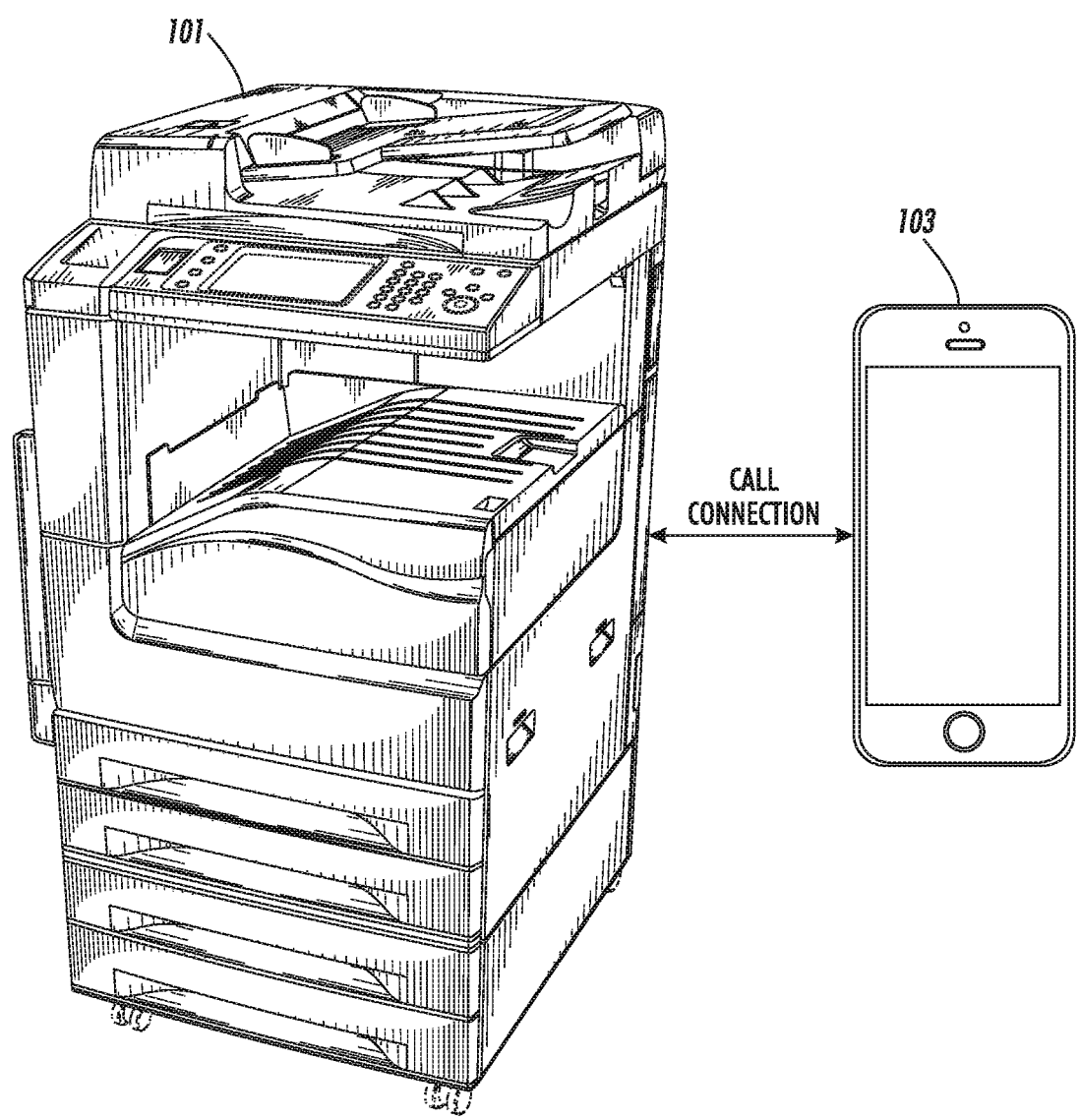

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or a combination thereof. In context of the current disclosure, the multi-function device assists users via voice-based instructions related to jobs. The multi-function device transmits one or more voice-based instructions related to print jobs to a mobile device of a user. The one or more voice-based instructions are provided through an Interactive Voice Response (IVR) unit.

The term "voice-based instructions" include voice-based instructions or voice-based notifications for users. The voice-based instructions are in the form of an audio message to which the users respond through the mobile device. The voice-based instructions include instructions where an input is required from the user. The voice-based notifications include messages, where no input may be needed from the user. The voice-based instructions include initial voice-based instructions and one or more further voice-based instructions.

The term "input key" refers to a key submitted/pressed by the user through the mobile device based on the voice-based instructions. The input key may be a number, a character, a special alphabet, or a combination thereof. For example, the input key may be *1, #1, 1, *0, abc@123, or the like.

The term "job" here includes a print job, which can be submitted through one or more ways, without limiting the scope of the disclosure.

The term "users" include any users who submit print jobs to the multi-function device and/or all users who use the multi-function device on day-to-day usage. The users may be sighted users, visually impaired users or partially visually impaired users without limiting the scope of the disclosure. The type of users does not interfere while implementing the present disclosure.

The term "a mobile device" refers to a device that the user typically uses for giving print commands and/or communicating with the multi-function device. For the visually impaired user or partially visually impaired user, the mobile device may be a braille-based mobile device. For other users, the mobile device may be, but is not limited to, a mobile phone, a tablet, a Personal Digital Assistant, a smart-phone or any other device capable of communication such as call.

Overview

Typically, multi-function devices have a telephone line (or embedded fax) that is used for transmitting data and sending/receiving fax. And the use of mobile device is common across all users including sighted users and visually impaired users. The Interactive Voice Response (IVR) technology is used for every business these days. In conventional solutions, the users provide their inputs through the multi-function device only or any information is displayed through a user interface of the multi-function device. And the users require to be present at the multi-function device for providing their inputs such as a passcode or for view the information such as status, job position, etc.; this may be frustrating for the users. Referring to the problems discussed above, the present disclosure provides a solution that leverages the telephone line currently available in the multi-function device, the use of mobile device by all users and the growing use of IVR technology. Although the disclosure here mentions the telephone line, but the disclosure can also be implemented with wireless phone capability in the multi-function device or later developed technologies. These different technologies are combined in a non-conventional way such that the combination of these technologies solve the problems related to print jobs in a new and non-obvious manner. In the non-conventional way, the present disclosure assists users through voice-based instructions. Specifically, the methods and systems transmit one or more voice-based job-related instructions to a mobile device of a user. The methods and systems allow the user to provide his input such as a passcode through the mobile device. As a result, the user does not require to be present at the multi-function device. In this manner, the present disclosure allows the user to handle his jobs in an efficient, effective and easier way.

Exemplary Multi-Function Device and Mobile Device

FIG. 1A is a real physical multi-function device 101 and a mobile device 103, which is communicatively coupled to the multifunction device 101 through a call connection. The multi-function device 101 prints a job as submitted by a user. In addition to printing, the multi-function device 101 may include functionalities such as scanning, faxing, copying, imaging or the like. As shown, the multi-function device 101 is a standalone device, but the multi-function device 101 may be communicatively coupled to other devices such as a LDAP server, a printing server, or other multi-function devices through a network as discussed in FIG. 1B. In place of the multi-function device 101, the disclosure may include a printing device, a multi-function peripheral device, a multi-function printer and so on.

Typically, a user submits a job and corresponding job attributes to the multifunction device 101. The multi-function device 101 receives the job as submitted. Upon receiving, the multi-function device 101 initiates and finishes executing the job. The multi-function device 101 delivers print outs of the job in a designed output tray, the output tray may be designated by the user or may be a default output tray. But in context of the present disclosure, after submitting the job, the user places a call through the mobile device 103 of the user. The multi-function device 101 receives the call through the mobile device 103 of the user and establishes a call connection between the multi-function device 101 and the mobile device 103. The multi-function device 101 then checks whether the mobile device 103 is a registered mobile device. After checking, the multi-function device 101 transmits one or more initial voice-based instructions to the mobile device 103 of the user. Based on the one or more initial voice-based instructions, the user presses an input key through the mobile device 103 of the user. Based on the input key, the multi-function device 101 transmits one or more further voice-based instructions to the mobile device 103. The one or more further voice-based instructions provide information about the job such as status of the job, additional job details and releasing the job. The status of the job indicates whether the job is a completed job, a progressing job, or a queued job. Various examples of the additional job details include creation time, user name, document name, paper size, number of pages, the position of the job in a job queue, estimated time of completion of the job, resources available with the multi-function device 101 for processing the job and so on. The releasing of the job requires inputting a passcode.

In an instance, the voice-based instructions help the user know the status of his job whether the job is completed or not, the job is under progress or the job is in a job queue and so on. In another instance, the voice-based instructions help the user locate his job (i.e., output tray where the job is delivered), help the user know the waiting time or his number in a print queue of the multi-function device 101, and so on. In further instance, the voice-based instructions request for the passcode to release the job, the passcode is provided through the mobile device 103 of the user. In this manner, the multi-function device 101 assists the user by providing voice-based job-related instructions to the mobile device 103 of the user and allows the user to submit his input through the mobile device 103 of the user, without requiring the user to be present at the multi-function device 101.

Figure 1B:
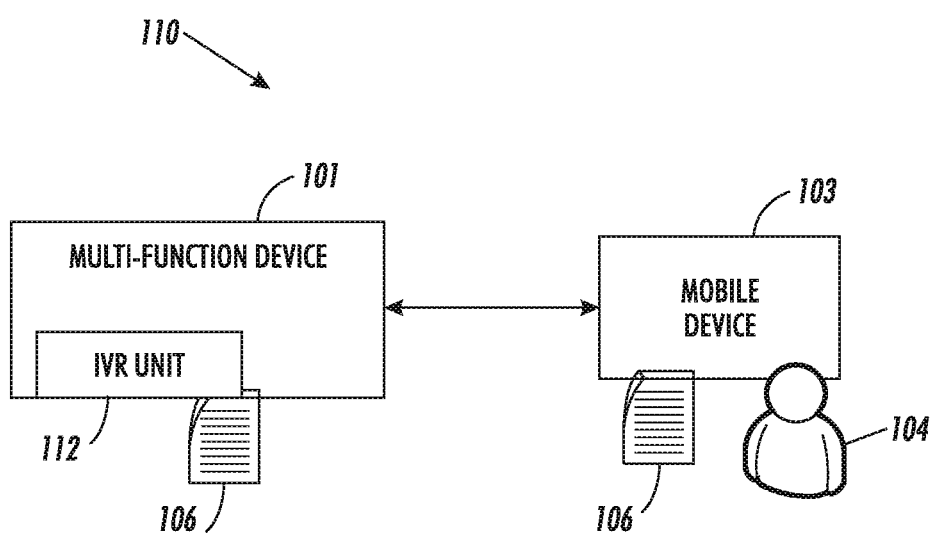
FIGS. 1B, and 1C illustrate exemplary environments in which various embodiments of the disclosure can be practiced.

FIG. 1B is an exemplary environment 110 in which various embodiments of the disclosure can be practiced. The environment 110 includes a mobile device 103, a user 104, a document 106, and a multi-function device 101. Various examples of the multi-function device 101 include, but not limited to, a multi-function printer, a scanner, a copier, a printer, or the like. Examples of the mobile device 103 may include a mobile phone, a tablet, a PDA, a smart-phone or any other device capable of data communication. The mobile device 103 may be a braille-based mobile device in case the user 104 is a partially sighted user or a visually impaired user. The mobile device 103 is communicatively coupled to the multi-function device 101 via a suitable network (although not shown). The network may be a wired network, a wireless network or a combination of these. The network may be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such networks. The network may either be a dedicated network or a shared network, which represents an association of the different types of networks that use a variety of protocols. The network may include network devices, such as network switches, hubs, routers, HBAs, for providing a communication link between the multi-function device 101 and other connected devices/systems such as the mobile device 103.

The user 104 uses the mobile device 103 for his day-to-day use such as calling, messaging, Internet surfing, submitting documents for printing, and so on. The mobile device 103 allows the user 104 to submit documents for printing, send messages, and other tasks. The mobile device 103 may be a smart phone having a feature that allows the user 104 to use the mobile device 103 for various purposes.

In context of the current disclosure, the user 104 uses the mobile device 103 for performing tasks related to his print job such as releasing the job, providing the input such as a passcode, inputting a key, etc. In some embodiments, the user 104 may have two separate devices such as a computing device (although not shown) and a mobile device. The computing device can be used for submitting documents for printing, or other tasks, while the mobile device 103 can be used for communicating with the multi-function device 101 and for providing inputs to the multi-function device 101. The document 106 represents any document which the user 104 submits for printing. Various examples of the document 106 include a text book, a research document, a project document, thesis, a journal, a report, a user guide, and so forth. The document 106 may be any sized document containing multiple pages. For example, the document 106 is of A4 size. However, the document 106 may be of sizes such as A2, A3, A5 and others without limiting the scope of the disclosure. The document 106 may be any MS office document such as a word document, ppt, excel, etc., a PDF document, a page description language (PDL) document such as PostScript (PS), Portable Document Format (PDF) and Extensible Markup Language (XML) Paper Specification (XPS).

The multi-function device 101 receives the document 106 from the user 104 and adds the document 106 as a print job in a print queue. The multi-function device 101 includes a communication unit for communicating with remote devices such as the mobile device 103, a computing device (not shown), a print server (not shown), a Lightweight Directory Access Protocol server (LDAP server) or any remote device. The communication unit is associated with a unique identity number, i.e., a unique phone number. The unique phone number identifies the multi-function device 101 and is of a pre-defined format. The unique phone number facilitates communication of the multi-function device 101 with the mobile device 103 and other devices. Similarly, the mobile device 103 is associated with a unique identity number, i.e., a unique mobile number. The unique mobile number identifies the mobile device 101 and is of a pre-defined format. The unique mobile number facilitates communication of the mobile device 103 with the multi-function device 101 and other devices. The user 104 uses the multi-function device 101 for his day-to-day tasks such as printing, copying, faxing, and so on. In context of the current disclosure, the multi-function device 101 uses the communication unit to receive a call from the mobile device 103 and sends voice-based job-related instructions over the communication unit. The voice-based instructions relate to his print job. To this end, the multi-function device 101 incorporates an interactive voice response (IVR) unit 112 to provide voice-based instructions to the mobile device of the user 104. As shown, the IVR unit 112 is a part of the multi-function device 101. But in some embodiments, the IVR unit 112 may be external to the multi-function device 101.

Initially, the user 104 registers his mobile device 103 with the multi-function device 101 and registration is one-time process. The user 104 submits the document 106 for printing which is received by the multi-function device 101. After submitting the job, the user 104 dials multi-function device phone number through the mobile device 103. When the multi-function device 101 receives the call through the registered mobile device 103, the multi-function device 101 automatically checks for the user's job. If the multi-function device 101 finds any job in a job queue or a job history, then the multi-function device 101 automatically activates the interactive voice response (IVR) unit 112 over the call. The IVR unit 112 sends voice-based instructions to the user 104 related to his job. More details will be discussed below in conjunction with remaining figures.

Figure 1C:
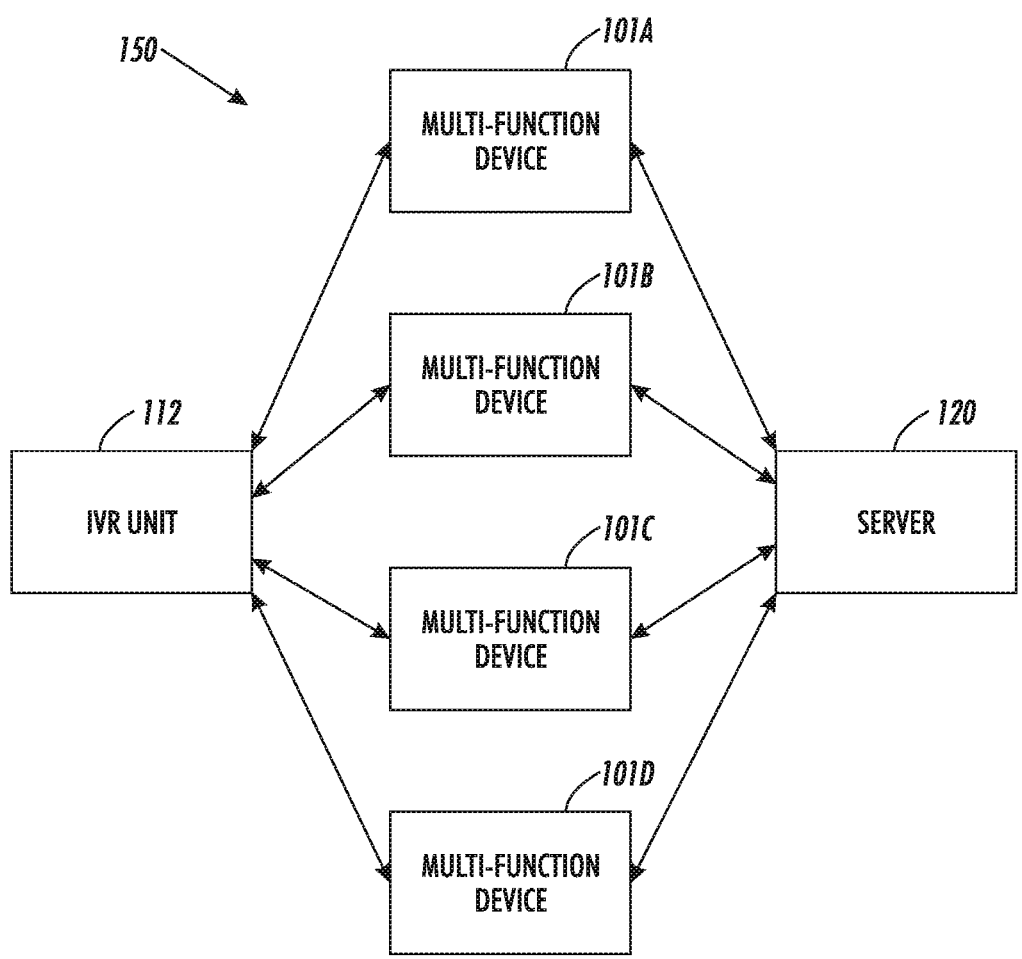

In some embodiments, there can be multiple multi-function devices 101A, 101B, 101C, and 101D as shown in environment 150 of FIG. 1C. The environment 150 includes multiple multi-function devices connected to each to other via a network (although not shown) as known in the art or later developed networks. Each multi-function device 101A-101D may be connected to the IVR unit 112 and a server 120 such as an LDAP server or a print server. In some implementations, each multi-function device 101A-101D may have respective IVR unit. The multi-function devices 101A, 101B, 101C, and 101D may be similar in software and/or hardware configuration and operate in the same way as the multi-function device 101 of FIG. 1A.

Figure 2A:
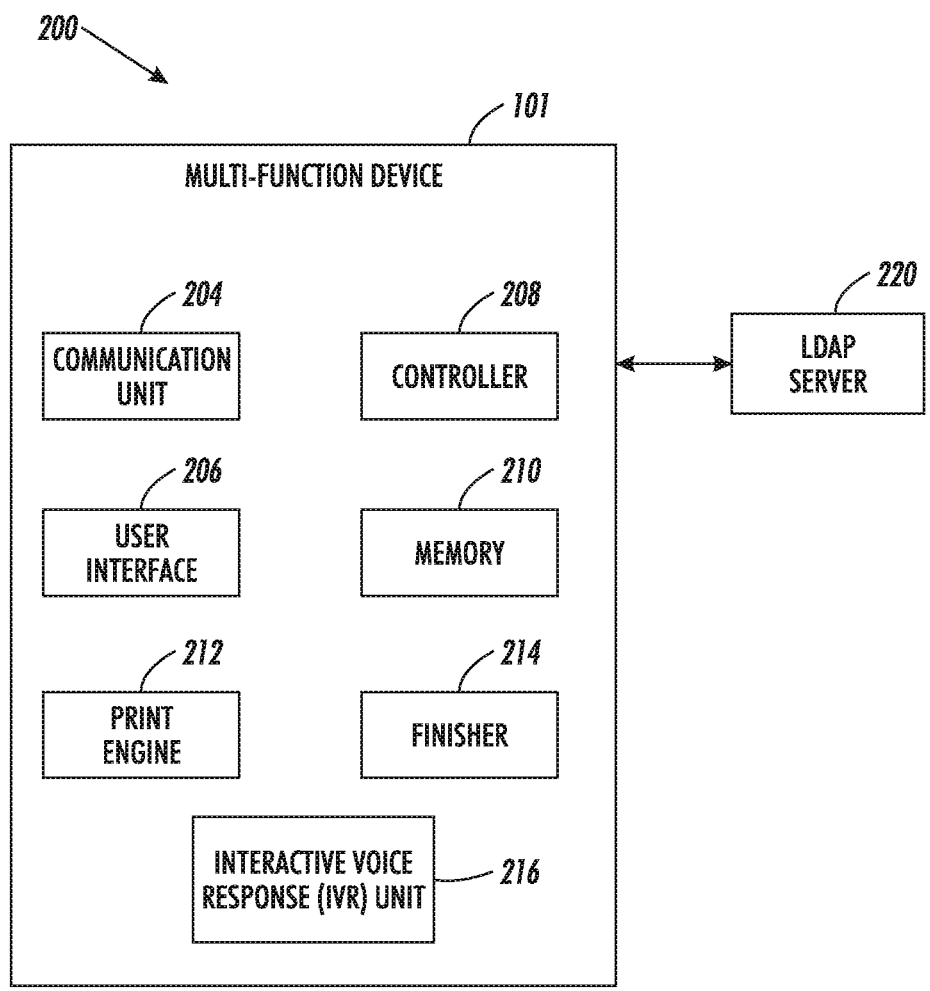

FIG. 2A shows a block diagram of an overall system 200 for assisting users through voice-based instructions on submitted jobs, jobs under progress and/or completed jobs. As shown, the system 200 includes a multi-function device 101 communicatively coupled to a LDAP (Lightweight Directory Access Protocol server) server 220 via suitable network as discussed above. The multi-function device 101 includes a communication unit 204, a user interface 206, a controller 208, a memory 210, a print engine 212, a finisher 214, and an Interactive Voice Response (IVR) unit 216. Each of the components 204, 206, 208, 210, 212, 214 and 216 are coupled to each other via a communication bus or later developed protocols and each of the components 204-216 communicate with each other for assisting users through voice-based instructions. The multi-function device 101 may include one or more additional components as required to implement the current disclosure.

The user first registers his details with the multi-function device 101. While registering, the user provides his details such as user name, user id, passcode or other details to identify the user and/or his job. In context of the current disclosure, the user registers his mobile number with the multi-function device 101. All details of the user are mapped with his mobile number in the LDAP server 220. The registered details are stored with the LDAP server 220 coupled to the multi-function device 101. In some implementations, the user can register with the help of an admin user via an Internet Services Program such as CentreWare Internet Services (CWIS) of the multi-function device 101. The multi-function device 101 can track and control the jobs.

The multi-function device 101 receives a job submitted by the user using his mobile device/print driver or Internet Services Program or the printing server. The job is listed in a print queue of the multi-function device 101. The job may be a secure job or a normal job. Each time when the user submits the job, the user initiates an interaction with the multi-function device 101 using his registered mobile device. The user places a call to the multi-function device 101 through his registered mobile number. The user dials the phone number of the multi-function device 101 through his registered mobile number of the mobile device 103.

As shown, the communication unit 204 includes a receiver and a transmitter (although not shown). The communication unit 204 receives a call from the mobile device 103. The communication unit 204 can be in the form of a telephone line facilitating landline phone capability. In other examples, the communication unit 204 can be in the form of a wireless line facilitating wireless phone capability. The communication unit 204 can include any electronic components for enabling landline/telephone or mobile communication. Upon receiving the call, the communication unit 204 establishes a call connection between the multi-function device 101 and the mobile device 103 through the communication unit 204. Further, one or more voice-based instructions are transmitted to the mobile device 103 over the communication unit 204 and input keys are received through the communication unit 204. The communication unit 204 may include a receiver for receiving and a transmitter for transmitting purpose.

Once the call connectivity is established with the multi-function device 101, then the controller 208 is triggered. The controller 208 contacts the LDAP server 220 for authenticating the mobile device and/or the user.

The LDAP server 220 is a server that facilitates authentication and security services. More specifically, the LDAP server 220 stores user details such as user name, user id, passcode, mobile number and other relevant user details. In the context of the disclosure, the LDAP server 220 performs authentication based on the mobile number of the user and/or the user details. The LDAP server 220 verifies whether the call received through the mobile device 103 is a registered mobile device or a registered user with the LDAP server 220. The LDAP server 220 checks the mobile number associated with the device in the LDAP server 220. In case the mobile number is found in the LDAP server 220 then the mobile device is authenticated. In this manner, the LDAP server 220 authenticates and authorizes the user to use the multi-function device 101 and its services. Once authenticated, the LDAP server 220 retrieves the user id or user name based on the mobile number. In addition to authenticating the mobile device of the user, the LDAP server 220 stores details about access and printing rights. For example, a mobile device may be allowed to utilize a corresponding to set of printing features (and other features), as indicated by the data maintained by the LDAP server 220. The LDAP server 220 determines access control, the access control may be determined based on, for example, a mobile number, a username, a group (or department) name, a device name, etc.

Once the LDAP server 220 authorizes the received call or authenticates the mobile device 103 of the user, the LDAP server 220 communicates the outcome to the controller 208 of the multi-function device 101. Along with the outcome, the LDAP server 220 communicates the retrieved user ID to the controller 208.

The controller 208 receives the authorization outcome and the user ID from the LDAP server 220. If the user is not authorized successfully by the LDAP server 220, the controller 208 stops the execution. If the user is authorized successfully by the LDAP server 220, the controller 208 proceeds further. Here, based on the received user ID, the controller 208 identifies the job corresponding to the user. The controller 208 checks a job queue and/or a job history to identify the job of the user. The controller 208 then checks status of the job and passes the status of the job to the IVR unit 216. The controller 208 automatically activates the IVR unit 216 over the established call. The controller 208 provides all instructions to the IVR unit 216.

Once activated, the IVR unit 216 transmits one or more one or more initial voice-based instructions to the mobile device 103 of the user over the established call. The one or more initial voice-based instructions relate to the print job of the user. The one or more initial voice-based instructions include various options for the user. Various options may be, "do you wish to know the status of the job then press 1," "do you wish to know the job details then press 2," or "do you want to release the print job then press 3."

Based on the one or more initial voice-based instructions, the user presses an input key through the mobile device 103 of the user. For example, if the user wishes to release the print job, then user presses 3 through a user interface of the mobile device. The IVR unit 216 receives the input key submitted through the mobile device 103 of the user. Based on the input key, one or more further voice-based instructions are transmitted to the mobile device 103 of the user over the established call, the one or more further voice-based instructions provide information about the print job, without requiring the user to be present at the multi-function device 101. Continued with the above example, the one or more further voice-based instructions may be entering the passcode to release the print job. The user inputs his passcode through the mobile device 103. The IVR unit 216 receives the passcode and passes the received passcode to the controller 208 for validation. The controller 208 further interacts with the LDAP server 220 to validate the passcode. The LDAP server 220 checks whether the received passcode matches the with the passcode stored corresponding to the mobile number of the mobile device 103 user. After validating, the job of the user is released.

In case of multiple jobs present in the job queue, the IVR unit 216 may provide voice-based instructions to the user to release either all their jobs or only a specific job. For example, the voice-based instructions may be, "Press # to release all jobs." In another example, the voice-based instructions may be, "Press * to release a specific job." In a further example, the voice-based instructions may be, "press 2 to release <<JOB ABC>>." Based on these voice-based instructions, the user provides his inputs through the mobile device 103 only. In this manner, the user need not wait at the multi-function device 101 for his job and the user stays aware about his job status in real-time through the mobile device 103. Moreover, the system 200 avoids all confusions for the user related to his job.

Continuing with FIG. 2A, the print engine 212 prints the job/document received from the user. In some cases, the printed documents are further passed to the finisher unit 214 for finishing purposes. At the multi-function device 101, the user interface 206 displays a print queue listing all jobs under progress and further displays a job history listing jobs that are completed. The user interface 206 displays the processing and progress of the all jobs at the time of execution. The memory 210 may store profile of the user. The profile includes the user details such as user id, mobile number, user name, passcode, his preferences and other details required for implementing the present disclosure. The memory 210 further stores all details associated with the received job. The details are deleted when the job is completed successfully. The job details are saved directly in the hard driver of the multi-function device 101.

As shown in the embodiment of FIG. 2A, IVR unit 216 is a part of the multi-function device 101. But the IVR unit 216 can be incorporated as a separate module/component. In such cases, the IVR unit 216 interacts with the multi-function device 101 to assists the user through voice-based instructions on their print jobs. The IVR 216 unit can be integrated with any device or system to provide voice-based instructions to the mobile device 103 of the user.

The present disclosure can be implemented in multiple ways. For example, the present disclosure can be implemented when there is a single multi-function device. In such cases, the multi-function device performs the functionalities for assisting users through voice-based job instructions. In another example, the disclosure can be implemented when there are multiple multi-function devices connected to each other via a suitable network. Each multi-function device is further connected to a LDAP server which stores all details related to users. In such scenarios, each multi-function device can perform functionalities for assisting users through voice-based job instructions. Each multi-function device may have a respective IVR unit or may be communicatively coupled to a single IVR unit. In another example, the disclosure can be implemented as a combination of the multi-function device and a server such as 120. The server interacts with the multi-function device to assist the user on their print jobs. And the server incorporates the IVR unit and performs all the functionalities as discussed above. The server stores user details and a mobile number associated with a mobile device of the user; authenticates the user based on the mobile number and the user details; checks whether the mobile device is a registered mobile device; automatically activates an interactive voice response (IVR) unit over an established call; transmits one or more initial voice-based instructions to the mobile device of the user over the established call, wherein the one or more initial voice-based instructions relate to the print job of the user; receives an input key submitted through the mobile device based on at least one initial voice-based instruction; based on the input key, transmits one or more further voice-based instructions to the mobile device of the user over the established call, wherein the one or more further voice-based instructions provide information about the print job, without requiring the user to be present at the multi-function device. In addition, the server receives a passcode submitted through the mobile device of the user to release the print job.

Figure 2B:
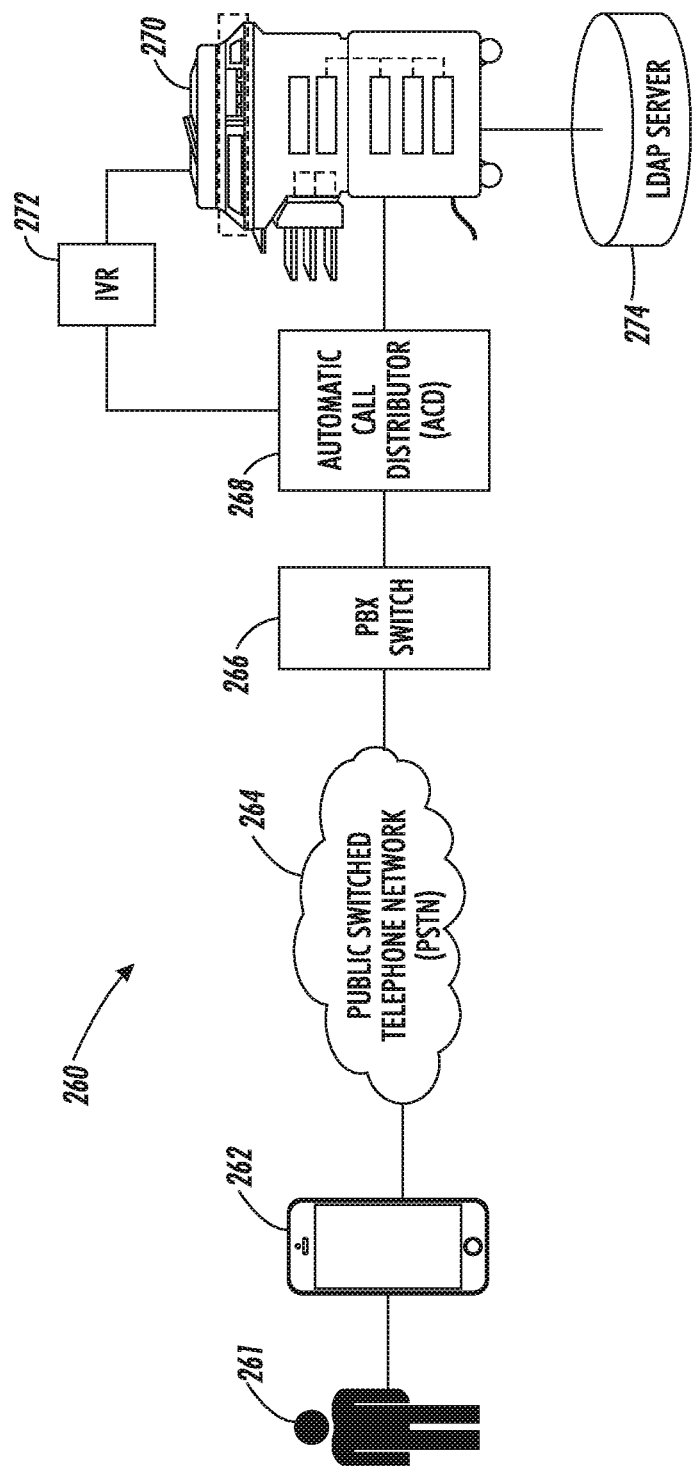
FIG. 2B is a flow diagram illustrating interaction between various components of the system.

FIG. 2B shows a block diagram 260 illustrating interaction between various components according to an exemplary embodiment of the disclosure. It is understood that the components shown here are exemplary and may vary based on the requirement and/or implementation. The flow diagram 260 includes a user 261, a mobile device 262, a public switched telephone network (PSTN) 264, a PBX switch 266, an automatic call distributor (ACD) 268, a multi-function device 270, an interactive voice response (IVR) unit 272 and a Lightweight Directory Access Protocol (LDAP) server 274. The block diagram 260 shows the components involved when the user 261 places a call through his mobile device 262. As shown, the user 261 carries the mobile device 262 which is connected to the PSTN 264 which is further communicatively coupled to the PBX switch 266, which is connected to the ACD 268, which is coupled to the multi-function device 270. The multi-function device 270 is communicatively coupled to the IVR unit 272 and the LDAP server 274.

The user 261 may be a visually impaired user who faces challenges while handling jobs after submission. For example, the user 261 may face challenge while tracking the job, collecting the job and so on. The user 261 may be a partially visually impaired user/partially sighted, the user may be a sighted user or may be a disabled user. The mobile device 262 is used by the user 261 for his day-to-day tasks. The mobile device 262 may be a braille-based device in case the user 261 is a visually impaired or a partially visually impaired user. The mobile device 262 may be a smart phone, where a mode for disabled users is provided. The mobile device 262 is used for communicating with the multi-function device 270 over voice calls.

The Public Switched Telephone Network (PSTN) 264 is a telecommunication network that allows users at different sites to communicate by voice. The PBX 266 is a telephone system with an enterprise that switches calls between an enterprise user for example, the user on local lines while allowing all users to share a certain number of external phone lines. The ACD 268 is a telephony device that answers and distributes incoming call to a specific group of terminals or agents with the enterprise such as the multi-function device 270.

The multi-function device 270 provides the functionalities of printing, scanning, copying, faxing or a combination thereof. The multi-function device 270 includes a communication unit through which calls are received from external devices such as the mobile device 262. Upon receiving the call, the multi-function device 270 validates a mobile number associated with the mobile device 262 with the help of the LDAP server 274 as discussed. The LDAP server 274 stores all user details including his user name, user id, passcode, password, mobile number, mapping of the user details with the mobile number and so on. For example, the LDAP server 274 stores mapping of the passcode and the mobile number associated with the mobile device 262. The details stored with the LDAP server 274 are used for authenticating the user/mobile device when a call is received from the mobile device 262. Upon validation, the IVR unit 272 is automatically activated. The IVR unit 272 sends one or more voice-based instructions to the mobile device of the user 261. The voice-based instructions provide information about the print job as well as allows the user 261 to know the status, to know the additional job details, to release the print job, without requiring him to be present at the multi-function device 270. The voice-based instructions relate to his jobs present in a job queue or a job history of the multi-function device 270.

Exemplary Flowcharts

Registration

Figure 3:
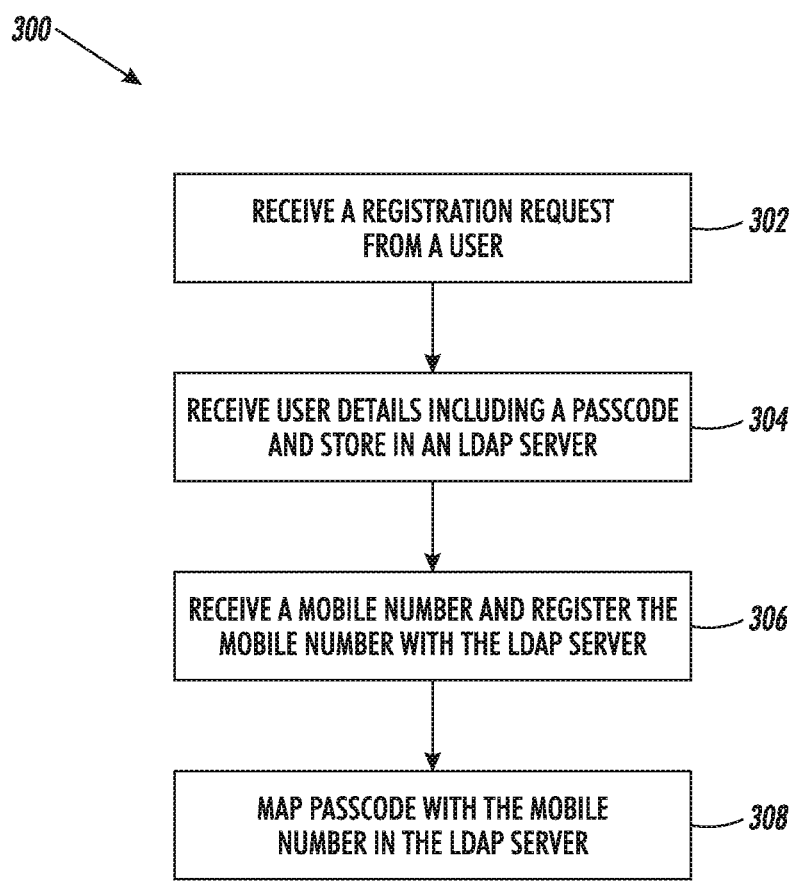
FIG. 3 is a method flowchart for registering users with a multi-function device.

FIG. 3 is a flowchart 300 for registering a user with a multi-function device. The user is registered for using the multi-function device and its services. Specifically, a mobile number associated with a mobile device of the user is registered with the multi-function device for receiving voice-based instructions related to his one or more jobs. The jobs are print jobs as an example. Specifically, the user registers his mobile number and other user details with an LDAP server, which is communicatively coupled to the multi-function device. The registration is a onetime process. The user, for example, a visually impaired user's details along with his mobile number are registered to multi-function device's LDAP server. When the user calls the multi-function device, the MFD (using LDAP) easily authorizes the user by comparing the unique mobile number. The voice-based instructions help the user easily track the jobs in an efficient and effective manner. In case of a visually impaired user, the user may take help from an admin user or other users for registration. The method 300 is described with respect to the multi-function device, where various blocks are implemented by the multi-function device with inputs from the user wherever necessary.

The method begins with when a user registers for using the multi-function device and its services. At 302, a request for registration is received from the user. Upon receiving the request, the multi-function device requests the user to provide his details including a user id, a user name, a passcode or other details of the user. Then, the user provides the requested details including a user name, a user id, a passcode, and so on. At 304, the user details are received and stored in a database or a server such as a LDAP server, LDAP database, and so on. The multi-function device then requests the user to provide his mobile number. The user provides his mobile number.

At 306, the mobile number of the user is received and is further registered with the multi-function device. Similar to the user details, the mobile number is stored with the LDAP server. The mobile number is used for identifying the user or authenticating the user. Further, the mobile number is used for providing inputs related to the jobs, for example, providing passcode for releasing the job, pressing keys for releasing the job and so on.

At 308, the passcode is mapped with the mobile number associated with the mobile device of the user. Other user details are also mapped with the mobile number of the user. The mapping of the user details and the mobile number is stored in the LDAP server. The details are retrieved for authentication or for identification when a call is received from the user. The received mobile number of the user is mapped with the user details such as a user name, a user id, or a passcode for identifying the user. These are just a few examples; the mobile number of the user may be mapped with other details of the user. The mapping is stored in the LDAP server. In this manner, the mobile number of the user is registered with the multi-function device or LDAP server for later retrieval and use. Once registered, the mobile number is ready for use such as, for example, receiving calls from the multi-function device or making calls to the multi-function device.

Voice-Based Assistance

Figure 4:
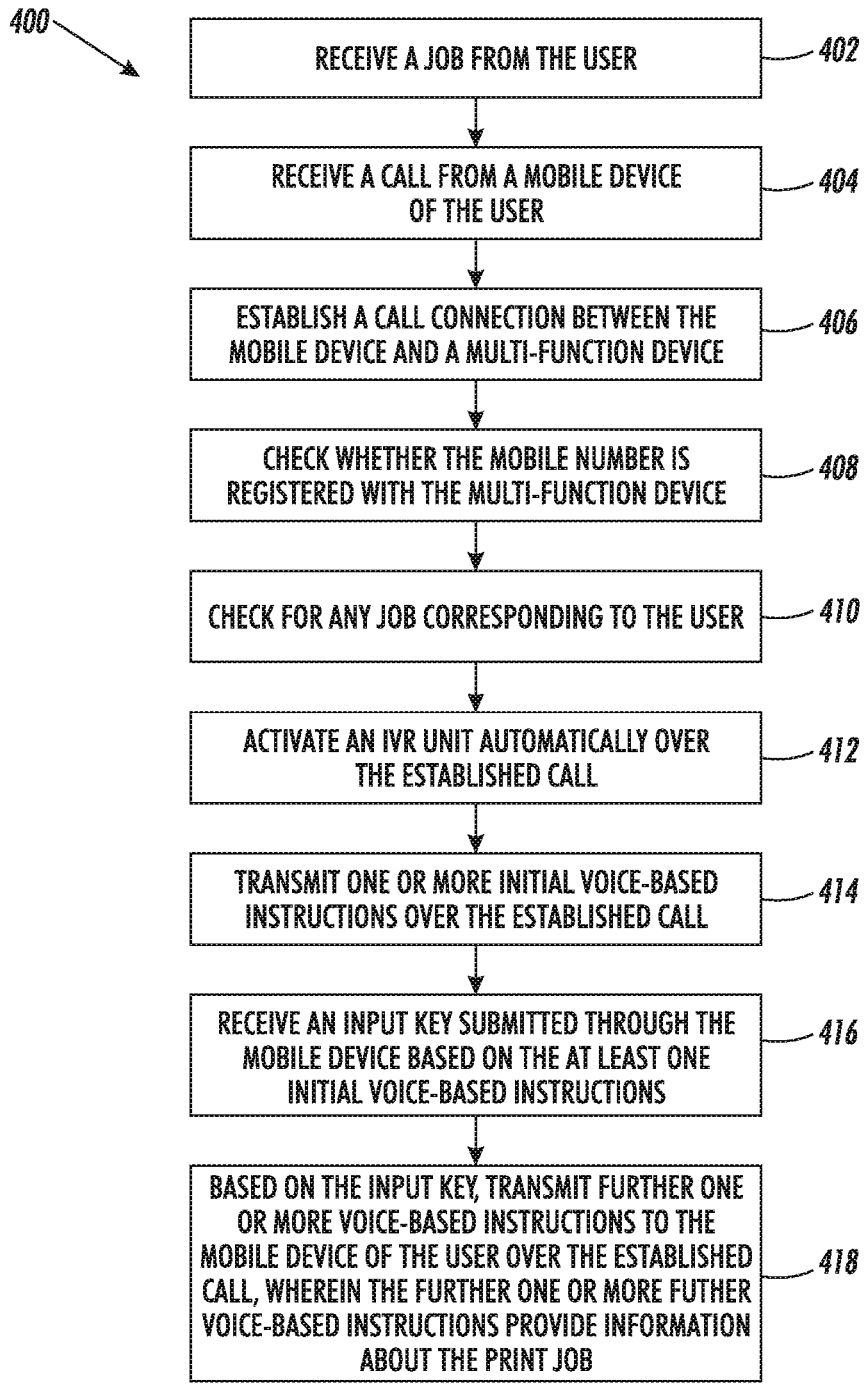
FIG. 4 is a method flowchart for assisting users via voice-based instructions related to print jobs.

FIG. 4 is a method flowchart 400 for assisting users through voice-based instructions. The voice-based instructions relate to one or more jobs of a user. The job may be a queued job, a progressing job and a completed job. It is considered that the registration process is completed, and the user is already registered with the multi-function device as discussed in conjunction with FIG. 3. The method 300 is described with respect to the multi-function device where various blocks are implemented by the multi-function device with inputs from the user wherever necessary. The method is implemented by the multi-function device and the multi-function device may contact an LDAP server.

The method begins when the user submits a print job to the multi-function device. The print job can be submitted from his computing device, a mobile device, Internet Services Program, server, gateways, and so on. At 402, the print job from the user is received. After receiving, the print job is listed/added in a print queue of the multi-function device. To know more about the submitted job, the user need not go to the multi-function device but directly initiates communication with the multi-function device through his mobile device. The user dials the telephone number of the multi-function device through his mobile device, or the user places a call request to the multi-function device. At 404, a call/the call request from the mobile device of the user is received. Upon receiving the call, the mobile number associated with the mobile device is identified and then, a call connection is established between the mobile device and the multi-function device at 406. It is checked whether the mobile number is registered with the multi-function device at 408. The multi-function device may contact the LDAP server to check whether the mobile device is registered, or the user associated with the mobile device is a registered user. The multi-function device may send the mobile number to the LDAP server for authentication and verification purpose. Based on the received mobile number, the LDAP server checks whether the mobile number matches with the stored data. If the mobile number is identified, the mobile device (or user) is successfully authenticated. The LDAP server retrieves the corresponding user ID and communicates back to the multi-function device and the method proceeds further. If the mobile number does not match with the stored data, the mobile number is not successfully authenticated, and the method stops. Here, the mobile number associated with the mobile device of the user is authenticated.

The user ID is received by the multi-function device. Based on the user ID, it is further checked whether there is any job corresponding to the user at 410. The job is checked in a job queue of the multi-function device or a job history. Once identified, status of the job of the user is checked. For example, it is checked whether the job is a completed job, a progressing job or a queued job. If the job is found in the job queue, the job is a queued job or a progressing job. But if the job is found in the job history, then the job is a completed job. The completed job is the one which is executed by the multi-function device in complete. The queued job is the one which is submitted by the user but is yet to be executed by the multi-function device. The progressing job is the one which is listed in the job queue, but its execution is already started.

At 412, an interactive voice response (IVR) unit is activated automatically over the established call.

At 414, one or more initial voice-based instructions are transmitted to the mobile device of the user over the established call. The one or more initial voice-based instructions relate to the print job of the user. The initial voice-based instructions include various options relate to the print job for the user. For example, various options may be whether he wishes to know the status of the job, whether he wishes to know more about job details or if he wishes to release the print job. Based on the one or more initial voice-based instructions, the user provides his input through the mobile device. The user submits his input key. At 416, the input key submitted by the user is received, based on the at least one initial voice-based instructions. Based on the submitted input key, one or more further voice-based instructions are transmitted to the mobile device of the user over the established call at 418. The one or more further voice-based instructions provide information about the print job, without requiring the user to be present at the multi-function device. The one or more further voice-based instructions relate to at least one of status of the print job, job details, and releasing the print job. In case the voice-based instructions related to releasing the job, the user requires to submit his passcode through the mobile device of the user. The passcode submitted through the mobile device of the user is received to release the print job. The passcode is further authenticated with the help of the LDAP server and finally the job is printed. The print job is printed based on the passcode submitted through the mobile device of the user or based on the authentication with the LDAP server.

An example is considered for better understanding of various examples of voice-based instructions and user input key. It is considered that the user submits the job, places the call, and the call is validated as discussed. After validating the call, the one or more initial voice-based instructions are transmitted over the call. The one or more initial voice-based instructions may be, "If you want to know the status of the job then press 1," "if you want to know more details of the job then press 2," and "if you want to release the job then press 3." In first example, it considered that the user presses the input key as 1 through the mobile device of the user. The multi-function device receives the input key 1 submitted through the mobile device of the user. Based on the input key 1, the multi-function device recognizes that the user wishes to know the status of the job. Accordingly, the multi-function device retrieves instructions corresponding to the status of the job and sends further voice-based instructions to the mobile device of the user. In this case, the further voice-based instruction may be, "the status of the job is completed," if the job is already completed. The further voice-based instruction may be, "the status of the job is progressing job," if the job is under progress. The further voice-based instruction may be "the status of the job is a queued job," if the job is queued and has to be executed. The further voice-based instructions are retrieved based on the current status of the print job.

In a second example, it is considered that the user submits 2 as an input key through the mobile device of the user. The multi-function device receives the input key 2 submitted through the mobile device of the user. Based on the input key 2, the multi-function device recognizes that the user wishes to know more job details. Based on the input key 2, the multi-function device sends further voice-based instructions. Accordingly, the multi-function device retrieves further voice-based instructions corresponding to submitted input key. The multi-function device sends further voice-based instructions to the mobile device of the user. In this case, the further voice-based instructions may be, "if you want to know about resources for the job, then press * 1," "if you want to know position of your job in a job queue, then press * 2," "if you want to know the estimated time for the job, then press *3," "if you want to promote the job to first position then press *4," "if you want to know an output tray then press *5," and "if you want to release the job, please enter the passcode." Continuing with the example, it is considered that the user wishes to know the estimated completion time. In such a case, the user submits/presses *3 through the mobile device of the user and the submitted input key is transmitted to the multi-function device. The multi-function device receives the input key *3 submitted through the mobile device of the user. The multi-function device checks the job queue and calculates the time for completion. Based on the calculation, the multi-function transmits further voice-based instructions to the mobile device of the user. The further voice-based instruction may be "the estimated time for the completion is 10 minutes." In this manner, all voice-based instructions are transmitted via the call established between the mobile device and the multi-function device. It is further considered that the user wishes to release the job, in such a case, the user enters the passcode through the mobile device of the user.

The multi-function device receives the submitted passcode and matches with the stored passcode of the user. Once the passcode is entered using the mobile device, the LDAP server authorizes the user by validating the user id, mobile number and passcode. Based on the match, the multi-function device releases the job of the user. The user can collect his print outs. In case the user, is a visually impaired user, another user may be his friend or relative may collect print outs on his behalf.

In some implementations, the method may transmit one or more voice-based instructions to the mobile device of the user. The one or more voice-based instructions may be sent without providing options to the user as discussed. Such voice-based instructions may not necessarily require any input from the user. After validating the mobile number of the user, the method starts sending direct voice-based instructions such as, "Your job is at 6th position in the job queue, please hold on;" (ii) "Your job will be completed within 10 minutes;" (iii) "To promote your job to first position, press #;" (iv) "All the resources for your job are available in the device;" (v) "To release your job, please enter your passcode, here the user enters the passcode via his mobile device, job is released by the multi-function device;" (vi) "Your job has been completed and it is delivered to top tray," and so on.

The present disclosure proposes an accessibility solution for visually-impaired users to securely release jobs at a Multifunction Device (MFD) using their mobile device. This disclosure uses a user's mobile device communicating with the MFD's communication unit through interactive voice response (IVR) to authenticate and release jobs, for example. The user's mobile device can be associated with the user's account in the LDAP server, allowing all authentication steps via the user's mobile device.

Exemplary Scenario

For better understanding, an exemplary case scenario is discussed. Initially, a user A registers his details user name & passcode along with his mobile number with multi-function device, i.e., with an LDAP server. The user A submits a secure print job from a 508 enabled device to the registered MFD/printer. And the submitted job is present at the sixth position of the job queue. To collect the print outs, the user A sends a friend or family member nearby to the MFD/printer. The user-A calls to the MFDs telephone number from his registered mobile number. The multi-function device contacts the LDAP server and verifies that call is received from the registered mobile number. Once the call is authenticated, then MFD/printer checks the job queue or the job history for the respective user's job. As the job is already present in the sixth place of the queue, the multi-function device starts passing notifications about the job status to the user via IVR. Few examples of the notifications include, (i) "Your job is at 6th position in the job queue, please hold on;" (ii) "Your job will be completed within 10 minutes;" (iii) "To promote your job to first position, press #;" (iv) "All the resources for your job are available in the device;" (v) "To release your job, please enter your passcode." Here the user enters the passcode via his mobile device, job is released by the multi-function device; (vi) Your job has been completed and it is delivered to top tray and so on. The notifications as provided via voice-based instructions provide real-time status updates to the user which help him track the job and further enables the user to collect the job with ease.

The methods and systems as discussed above can be configured in any manner. It is understood that various voice-based instructions, input keys, format of the instructions, are exemplary in nature and there can be many variations to these. In addition, the methods and systems can be modified to provide any voice-based instructions related to prints jobs submitted at the multi-function device.

Flow Diagrams

Figure 5A:
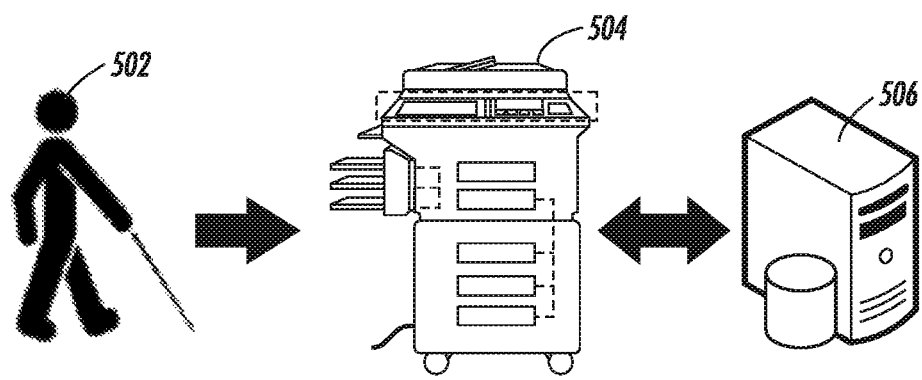
FIGS. 5A, 5B and 5C represent various flow diagrams, according to embodiment of the disclosure.
Figure 5B:
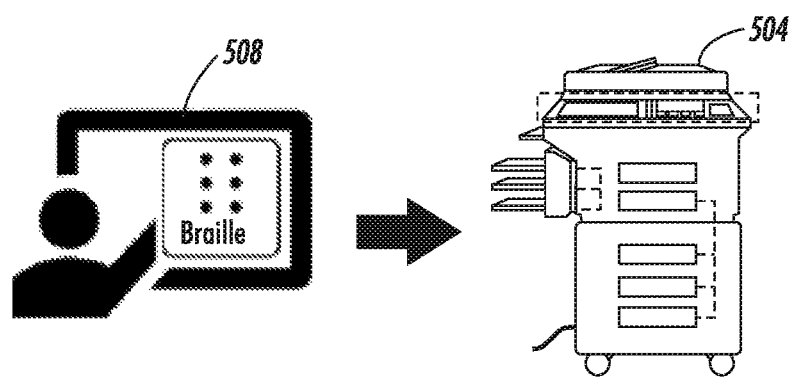
Figure 5C:
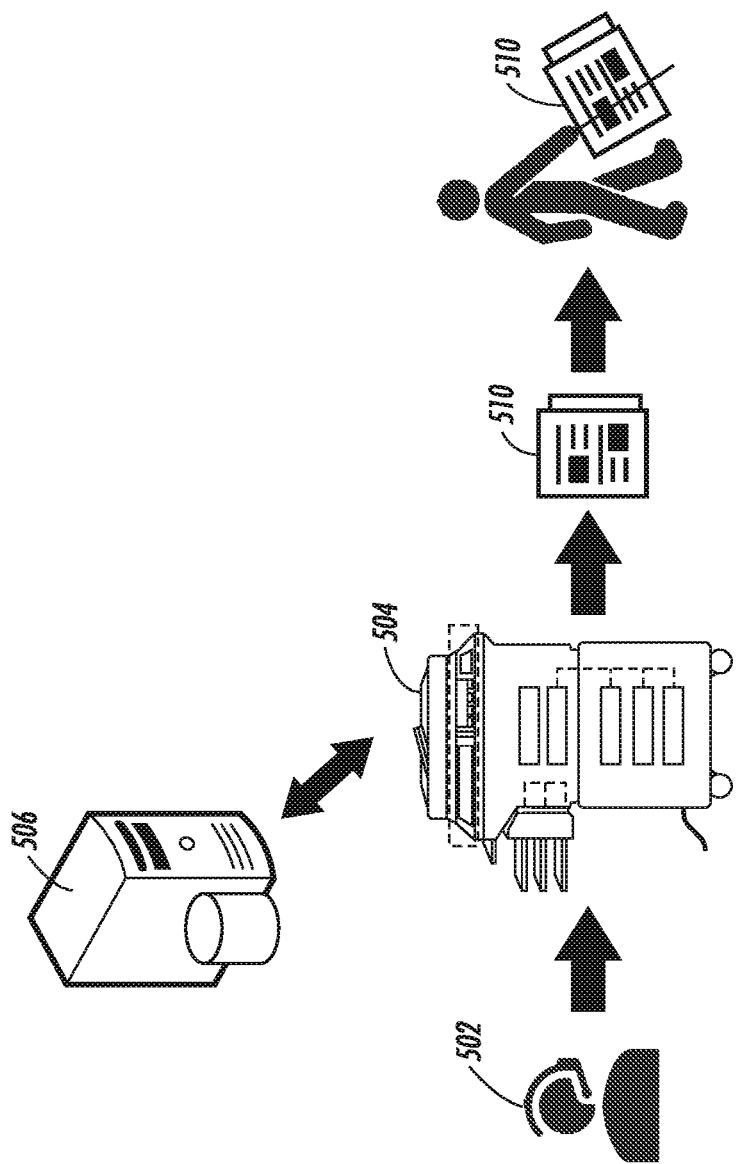

FIGS. 5A, 5B and 5C show flow diagrams illustrating interaction between various components of the system. FIG. 5A shows a visually impaired user 502 registers his details along with his mobile number with an LDAP server 506 and the user 502 completes the registration process with a multi-function device 504. The registered details are stored with the LDAP server 506. As shown in FIG. 5B, the visually impaired user 502 submits a print job to the multi-function device 504 using his hand-held device 508, which is braille keyboard supported device. As clearly indicated in FIG. 5C, the visually impaired user 502 calls from his registered mobile device to the multi-function device 504. The multi-function device 504 interacts with the LDAP server 506 for validation. If the job corresponding to the user is found, the multi-function device 504 starts giving instructions to the user via IVR unit. The user 502 can release his print jobs 510 following IVR's instructions and finally collects the printouts 510 as shown.

The present disclosure discloses methods and systems for assisting users via interactive voice-based instructions. The voice-based instructions enable all users and other users to keep a track of their submitted jobs, to know the current status of the submitted jobs, time that is taken to release the job, to release the submitted jobs and so on. In this manner, the users can stay updated about their submitted jobs, without being present at the multi-function device. The methods and systems further provide multi-layered security on handling the submitted jobs. The first layer of security includes verifying mobile numbers associated with respective mobile devices of the users and the second layer of security includes enabling the users to input their passcodes through their mobile devices only. An additional layer of security includes transmitting the voice-based instructions to the mobile device of the user, i.e., personal device of the user. The methods and systems further increase the convenience and flexibility for all users on handing print jobs in the multi-function device. The disclosure offers greater user experience and helps all users (including visually impaired users and sighted users) to handle their submitted jobs in an effective and easier way. In addition, the methods and systems offer a low-cost solution. The methods and systems can be extended on ordering and handling the consumables of the multi-function device. The methods and systems allow the user to release their submitted jobs through the voice-based instructions only.

The disclosure is helpful for users when the users want to track their print jobs such as current status of the jobs, want to know resources availability of their jobs, wishes to know estimated time or other details related to respective print jobs.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "checking" or "identifying" or "assisting" or "receiving" or "authenticating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for assisting users for a print job via interactive voice-based instructions, the method is implemented at a multi-function device, comprising the steps of:
    receiving the print job from a user;
    receiving a call from a mobile device of the user;
    establishing a call connection between the mobile device and the multi-function device;
    checking whether the mobile device is a registered mobile device;
    after checking, identifying the print job corresponding to the user;
    automatically activating an interactive voice response (IVR) unit over the established call;
    transmitting one or more initial voice-based instructions to the mobile device of the user over the established call, wherein the one or more initial voice-based instructions relate to the print job of the user;
    receiving an input key submitted through the mobile device of the user, based on at least one initial voice-based instruction; and
    based on the input key, transmitting further one or more voice-based instructions to the mobile device of the user over the established call, wherein the further one or more voice-based instructions provide information about the print job, without requiring the user to be present at the multi-function device.

2. The method of claim 1, further comprising registering user details and a mobile number associated with the mobile device of the user with the multi-function device.

3. The method of claim 1, further comprising registering user details and a passcode with the multi-function device.

4. The method of claim 1, further comprising mapping a passcode with a mobile number associated with the mobile device of the user.

5. The method of claim 1, further comprising authenticating a mobile number associated with the mobile device of the user.

6. The method of claim 1, further comprising identifying the print job in a job queue or a job history.

7. The method of claim 1, wherein the print job is one of a queued job, a progressing job, and a completed job.

8. The method of claim 1, wherein the further one or more voice-based instructions relate to at least one of status of the print job, additional job details, and releasing the print job.

9. The method of claim 1, further comprising receiving a passcode submitted through the mobile device of the user to release the print job.

10. The method of claim 1, further comprising printing the print job.

11. The method of claim 1, further comprising releasing the print job based on a passcode submitted through the mobile device of the user.

12. A multi-function device, comprising:
    a communication unit being configured for receiving a call from a mobile device of the user;
    a controller being configured for:
        establishing a call connection between the mobile device and the multi-function device;
        checking whether the mobile device is a registered mobile device;
        after checking, identifying a print job corresponding to the user; and
        automatically activating an interactive voice response (IVR) unit over the established call; and
    the IVR unit being configured for:
        transmitting one or more initial voice-based instructions to the mobile device of the user over the established call, wherein the one or more initial voice-based instructions relate to the print job of the user;
        receiving an input key submitted through the mobile device of the user, based on at least one initial voice-based instruction; and
        based on the input key, transmitting further one or more voice-based instructions to the mobile device of the user over the established call, wherein the further one or more voice-based instructions provide information about the print job, without requiring the user to be present at the multi-function device.

13. The multi-function device of claim 12, wherein the print job is one of a queued job, a progressing job, and a completed job.

14. The multi-function device of claim 12 is communicatively coupled to the mobile device of the user.

15. The multi-function device of claim 12 is communicatively coupled to a Lightweight Directory Access Protocol (LDAP) server.

16. The multi-function device of claim 12, wherein the further one or more voice-based instructions relate to at least one of status of the print job, additional job details, and releasing the print job.

17. The multi-function device of claim 12, wherein the IVR unit is further configured to receive a passcode submitted through the mobile device of the user, to release the print job.

18. The multi-function device of claim 12, wherein the controller is further configured to register user details and a mobile number associated with the mobile device of the user, with a Lightweight Directory Access Protocol (LDAP) server.

19. The multi-function device of claim 12, wherein the controller is further configured to register a passcode and map the passcode with a mobile number associated with the mobile device of the user, with a Lightweight Directory Access Protocol (LDAP) server.

20. A system, comprising:
a mobile device for transmitting a call request to a multi-function device, wherein the mobile device is associated with a mobile number;
the multi-function device communicatively coupled to the mobile device, comprising:
a communication unit being configured for receiving the call request from the mobile device of a user;
a controller being configured for:
establishing a call connection between the mobile device and the multi-function device;
identifying a print job corresponding to the user; and
automatically activating an interactive voice response (IVR) unit over the established call; and
the IVR unit being configured for:
transmitting one or more initial voice-based instructions to the mobile device of the user over the established call, wherein the one or more initial voice-based instructions relate to the print job of the user;
receiving an input key submitted through the mobile device based on at least one initial voice-based instruction; and
based on the input key, transmitting further one or more voice-based instructions to the mobile device of the user over the established call, wherein the further one or more voice-based instructions provide information about the print job, without requiring the user to be present at the multi-function device; and
a Light Weight Directory Access Protocol (LDAP) server, communicatively coupled to the multi-function device, wherein the LDAP server is configured for:
storing user details, a passcode, and the mobile number associated with the mobile device of the user; and
authenticating the user based on the mobile number and the user details.

21. The system of claim 20, wherein the further one or more voice-based instructions relate to at least one of status of the print job, job details, and releasing the print job.

22. The system of claim 20, wherein the IVR unit is further configured to receive the passcode submitted through the mobile device of the user to release the print job.

23. A system, comprising:
a multi-function device communicatively coupled to a server, comprising:
a communication unit being configured for receiving a call from a mobile device of a user; and
the server being configured for:
storing user details and a mobile number associated with the mobile device of the user;
authenticating the user based on the mobile number and the user details;
checking whether the mobile device is a registered mobile device;
automatically activating an interactive voice response (IVR) unit over an established call between the multi-function device and the mobile device;
transmitting one or more initial voice-based instructions to the mobile device of the user over the established call, wherein the one or more initial voice-based instructions relate to a print job of the user;
receiving an input key submitted through the mobile device based on at least one initial voice-based instruction; and
based on the input key, transmitting further one or more voice-based instructions to the mobile device of the user over the established call, wherein the further one or more voice-based instructions provide information about the print job, without requiring the user to be present at the multi-function device.

24. The system of claim 23, wherein the further one or more voice-based instructions relate to at least one of status of the print job, additional job details, and releasing the print job.

25. The system of claim 23, wherein the server is further configured to receive a passcode submitted through the mobile device of the user to release the print job.

26. A method for implementing an interactive voice response (IVR) unit for assisting users through one or more voice-based instructions, the method comprising the steps of:
transmitting one or more initial voice-based instructions to a mobile device of a user, wherein the one or more initial voice-based instructions comprise one or more options for the user;
receiving an input key submitted through the mobile device based on at least one initial voice-based instruction; and
based on the input key, transmitting further one or more voice-based instructions to the mobile device of the user over an established call between the IVR unit and the mobile device, wherein the further one or more voice-based instructions provide information about a print job.

27. The method of claim 26, wherein the further one or more voice-based instructions relate to at least one of status of the print job, job details, and releasing the print job.

* * * * *